March 6, 1934.  D. D. SHELTON  1,950,066
RETORT
Filed Aug. 24, 1931  7 Sheets-Sheet 1

March 6, 1934.  D. D. SHELTON  1,950,066
RETORT
Filed Aug. 24, 1931   7 Sheets-Sheet 2

Inventor
Donald D. Shelton
Attorney

Fig. 12

March 6, 1934.   D. D. SHELTON   1,950,066
RETORT
Filed Aug. 24, 1931   7 Sheets-Sheet 5

Inventor
Donald D. Shelton
Attorney

Patented Mar. 6, 1934

1,950,066

UNITED STATES PATENT OFFICE 1,950,066

RETORT

Donald D. Shelton, Portland, Oreg.

Application August 24, 1931, Serial No. 559,036

12 Claims. (Cl. 263—21)

My invention relates to furnaces wherein the heat for treating the material is indirectly applied to the material being treated.

The invention is comprised primarily of a furnace comprised of an inner stationary wall and an outer, louvered, movable wall. The walls are spaced apart to permit the material being treated to pass therebetween. The primary heat for treating the materials is supplied to one of the walls and to the opposite side of the wall to which the material being treated is made to come in intimate contact. The movable wall is louvered to permit a free escape of the volatile component elements being liberated from the material being treated.

To aid in the treating of the materials, such as cinnabar ore, I preheat the air to be admitted into the mass of material being treated and admit the air into the material, being treated, at a higher temperature than the condensation point of the vapors which are liberated from the material being treated to thereby prevent the vapors from condensing within the treating zone.

I provide a movable preliminary roaster, or dehydrator above the primary furnace and through which the material being treated, as cinnabar ore, is passed. The treating temperature, however, is held below the vaporization point of the volatile elements that are to be recovered.

The material is first crushed to a predetermined, maximum size, and is elevated by suitable conveying machinery to a bin that is superposed the roasting chamber from where it is drained by gravity directly into the roasting chamber. The heat for the dehydration and roasting and for the heat treating of the materials and for the heating of the air is developed within a fire box disposed adjacent the furnace and from where the heat within the fire box is delivered directly to the furnace. Pipes for supplying the heated air run directly through the fire box and the same are of sufficient size and capacity to heat the air above the condensation point of the volatiles to be recovered that are liberated in the primary treating zone. Great care is taken to prevent the escape of the volatile elements to be recovered. The volatiles are delivered into a condenser comprised of a plurality of U-shaped glazed terra cotta pipes that are exposed to the air and which may, or may not be cooled on the exterior by other means than that of the atmosphere. In the treating of certain ores, as cinnabar ore, where the treatment is carried on in a hot climate it may be found necessary to cool the condensing tubes by water sprays, or jets, or by other means.

At the point of greatest heat transfer within the primary heat supplying furnace, the furnace shell is comprised of a plurality of sections secured together by any suitable means as through the use of rods.

The passageway through which the mass of material passes uniformly increases in cross sectional area from the top to the bottom of the passageway to facilitate the passage of the material therethrough and to compensate for any swelling that may occur as the treatment progresses.

The treated residue is deposited upon power rotated drums that have spaced fins disposed upon their exterior to maintain a proper seal at the base of the furnace. The residue is then deposited from the drums into eliminating screw conveyors. This provides an air tight seal at the base of the furnace and prevents normal cooled air from entering the furnace, which prevents any condensation of the vapors to be recovered within the treating area.

One of the objects of my invention consists in providing suitable mechanisms having correlated parts for the continuous treatment of materials containing a volatile content that is to be recovered. The device may be used in the treating of materials containing a volatile element that is to be recovered and also containing a primary residue that is to be recovered.

A further object of my invention consists in providing a device of this character comprised of a primary heat supplying furnace, from where the heat is drawn that is to be indirectly applied to the material and from where the heat is indirectly obtained that is to be applied to the material that is to be dehydrated before the same enters the primary treating zone. The heat for the dehydration is kept below the volatilizing temperature of the elements to be liberated in the primary heat treating area and that are to be recovered.

A further object of my invention consists in supplying heated air into the mass being treated to create an exothermic reaction that will occur in sulphur bearing ores. I deliver the air at, or above the volatilizing temperatures of the vapors to be recovered to thereby prevent any condensation of the vapors within the treating areas.

And a still further object of my invention consists in providing a furnace primarily intended for the use of treating cinnabar and mercurial ores that will be entirely safe for workmen and that will prevent the salivating of the workmen.

A still further object of my invention consists in providing a device for the treating of cinnabar and mercury bearing ores that may be used successfully in the treating of relatively lean ores and where practically the entire mercurial content of the same may be recovered.

And a still further object of my invention consists in so constructing the device that the oxidation and the condensing of the mercury vapor within the primary heat treating area is practically eliminated.

A further object of my invention consists in the indirect application of the heat to the ore mass which prevents an amalgamation of the combustion gases with the mercury vapor.

A further object of my invention consists in preheating the flux air above the boiling point of the mercury before its introduction into the ore stream. This prevents the premature condensation of the mercury vapor and insures the separation of the sulphur from the mercury prior to reaching the critical temperature of condensation of the mercury vapor.

A further object of my invention consists in preheating the ore for dehydration purposes to a maximum of approximately 550 degrees Fahrenheit before the ore enters the primary furnace, thus preventing a mixing of the moisture content with the sulphur thereby minimizing if not entirely eliminating the forming of sulphurous acid within the retort, or within the condensing system.

A further object of my invention consists in passing the volatile content of the dehydrated ore through the condensing system which greatly lessens the recovery problems and also greatly lessens the size and magnitude of the condensing system itself.

A further object of my invention consists in operating the device in a continuous manner which greatly reduces the number of required attendants over the old batch system.

A further object of my invention consists in providing a device that reduces the hazard of mercurial poisoning to a minimum.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings.

Like reference characters refer to like parts throughout the several views.

I have provided a furnace and suitable associated correlated parts so that green, undried ore, or other material taken from a quarry, or other source of supply, may be delivered directly into a crusher 1, where the material is reduced to a maximum predetermined size. I then elevate the crushed material by a suitable endless conveyor 2 and deliver it into a storage bin 3. The storage bin is superposed a dehydrator 4, or pre-drier that is mounted by means of wheels 5 upon a track 6 to facilitate its movement with respect to the apparatus.

The purpose of rendering the dehydrator mobile is to permit access to the furnace when necessary.

The ore is fed, by gravity, from the storage bin directly into the dehydrator and the ore flows, by gravity directly from the dehydrator into the primary retort. The furnace is comprised of a base 7 and an outer shell 8. The outer shell may be made of brick, concrete, or other suitable material.

A suitable refractory lining 9 is disposed within the primary furnace and is spaced apart from the masonry shell by insulating material 10 as diatomite or the like. The diatomite lining conserves the heat and facilitates maintaining the furnace at a suitable working temperature. A fire box 11 is provided and is fired by any suitable fuel as gas, oil, coal, or wood. The heat supplying products from the fire box are delivered directly into the base of the furnace shell. The primary heat is indirectly applied to the mass of material being treated.

In the treatment of cinnabar ores it is highly desirable to prevent contact of the water vapor being liberated from dehydrated ore with the sulphur vapors that are liberated in the treatment of the ore in the primary heat treating zone. Were this not prevented an extensive condensing system would be required to accommodate the increased volume of vapors arising in the dehydrating and primary treating process. The presence of water vapor in the primary treating zone in the presence of air would develop sulphur dioxide and sulphur trioxide thereby forming sulphurous and sulphuric acid. Where this occurs it is necessary that the condensing system be constructed of non-oxidizing materials. Where the mixing of the water vapor with the sulphur vapor is prevented as in my retort very satisfactory results are obtained and the forming of sulphuric acid compounds within the treating zone is prevented. This insures longer life to the metal parts of the furnace and enables me to use less expensive metals.

Separating the mercury from the sulphur is accomplished in my retort by introducing preheated air within the ore mass being treated at a temperature above the boiling point of the mercury which is substantially above 680 degrees Fahrenheit.

I introduce the heated air through the heat wall and it immediately combines with the sulphur vapor being liberated, thereby setting up an exothermic reaction which materially assists in maintaining a suitable temperature and leaves the mercury vapor in a volatile state until the same enters the condenser where it is condensed and precipitated into metallic quicksilver.

Figures 1, 2, 3, 4:
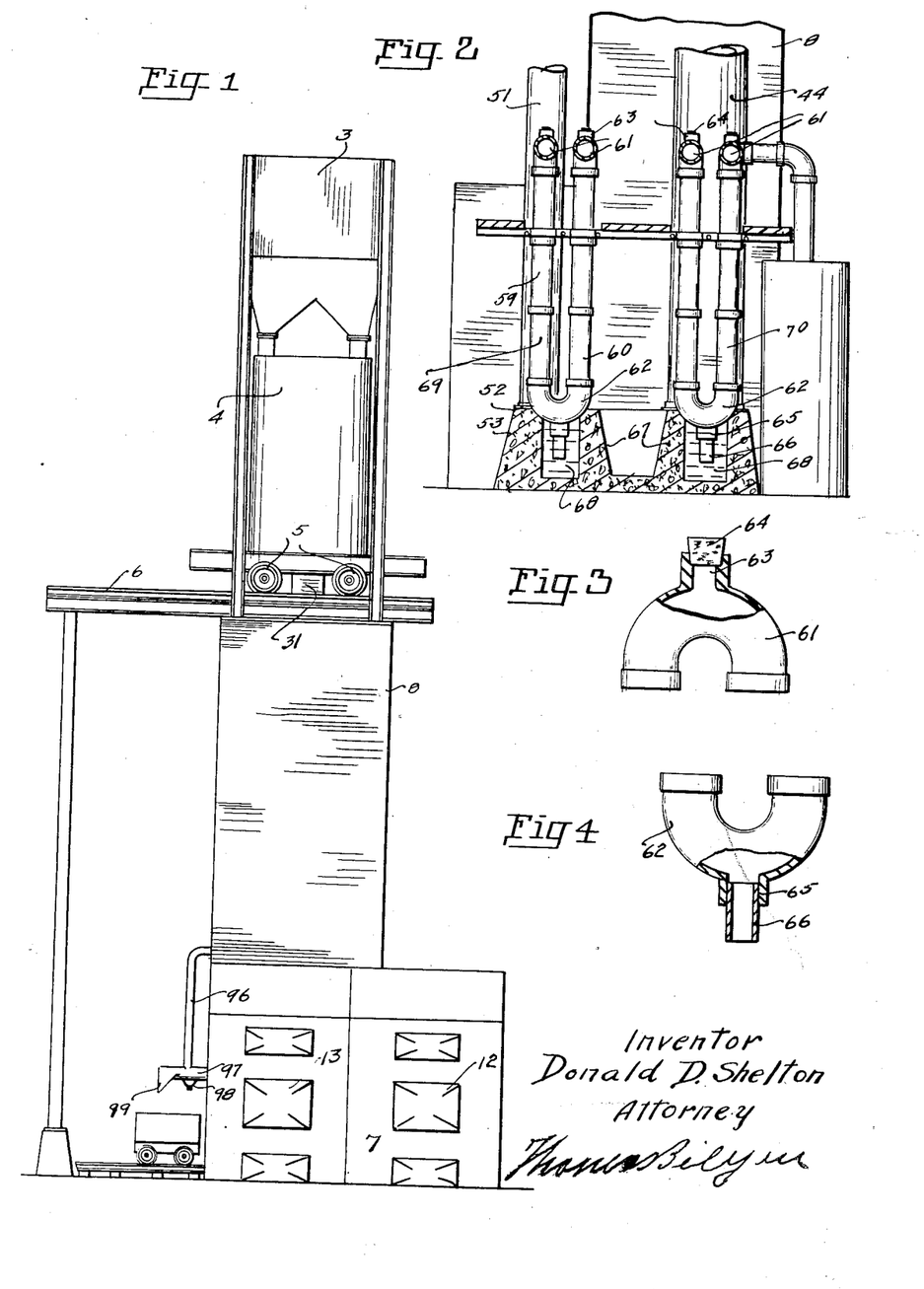
Fig. 1 is a front view of the assembled device.
Fig. 2 is a sectional side view of the condensing end of the assembled device. The same is taken on line 2—2 of Fig. 5, looking in the direction indicated.
Fig. 3 is a side view, partially in section, of an upturned loop end of one of the condenser coils.
Fig. 4 is a side view, partially in section of the lower end of one of the elbows, or return bends placed within the condenser system, illustrating its use in being operated in conjunction with a water seal placed at the upper end of the return bend.
Figure 5:
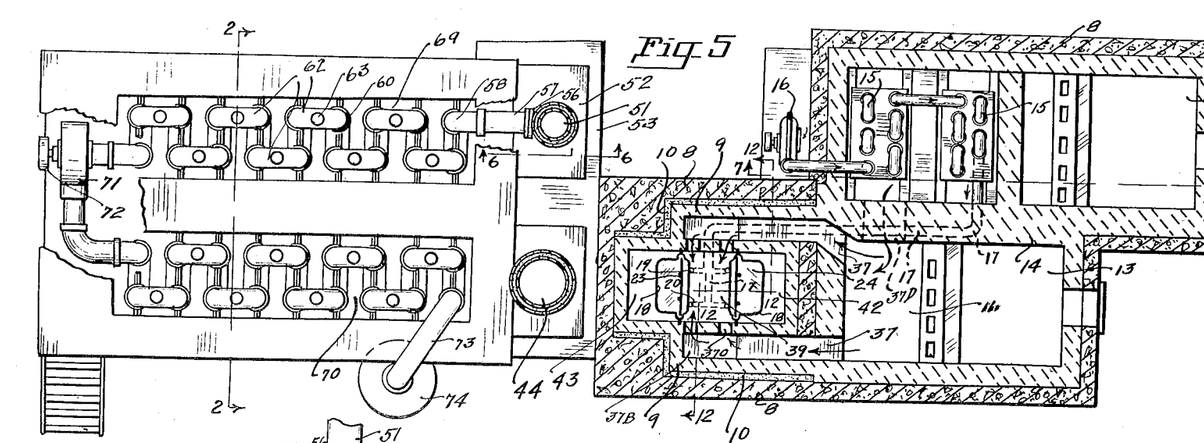
Fig. 5 is a sectional, plan view of the assembled furnace. The same is taken on line 5—5 of Fig. 18, looking in the direction indicated.
Figures 6, 7:
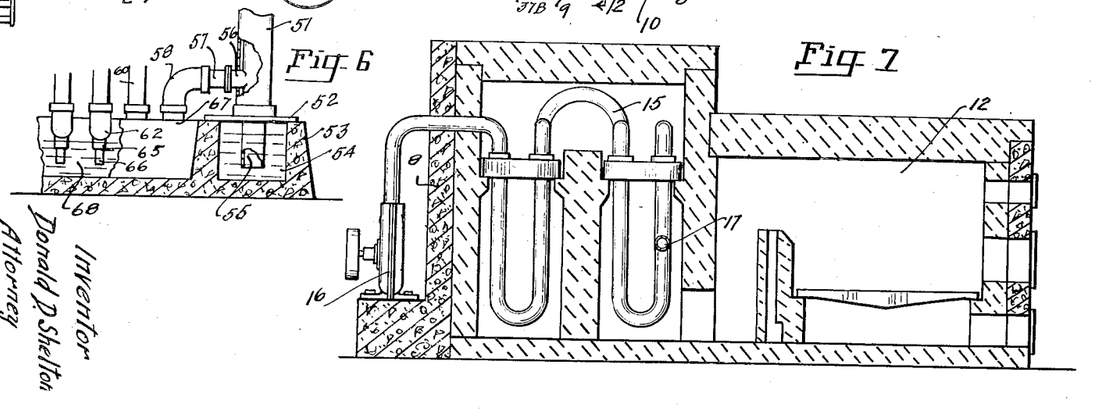
Fig. 6 is a fragmentary, sectional, side view of the vapor stack and of the pipe connections disposed between the stack and condenser coil. The same is taken on line 6—6 of Fig. 5, looking in the direction indicated.
Fig. 7 is a fragmentary, sectional, side view of the coils for supplying heated air into the mass of ore being treated. The same is taken on line 7—7 of Fig. 5, looking in the direction indicated.

Referring to Fig. 5, I provide two independent fire boxes 12 and 13, each being independently fired. I separate the same by a suitable partition wall 14. The fire box 12 has the major portion of its heat absorbed by piping 15 adapted to permit normal air passage therethrough, through the use of any suitable pumping means such, for instance, as a power driven fan 16. The air developed within the piping is delivered into the pipe 17.

Figures 15, 16, 17, 18, 19:
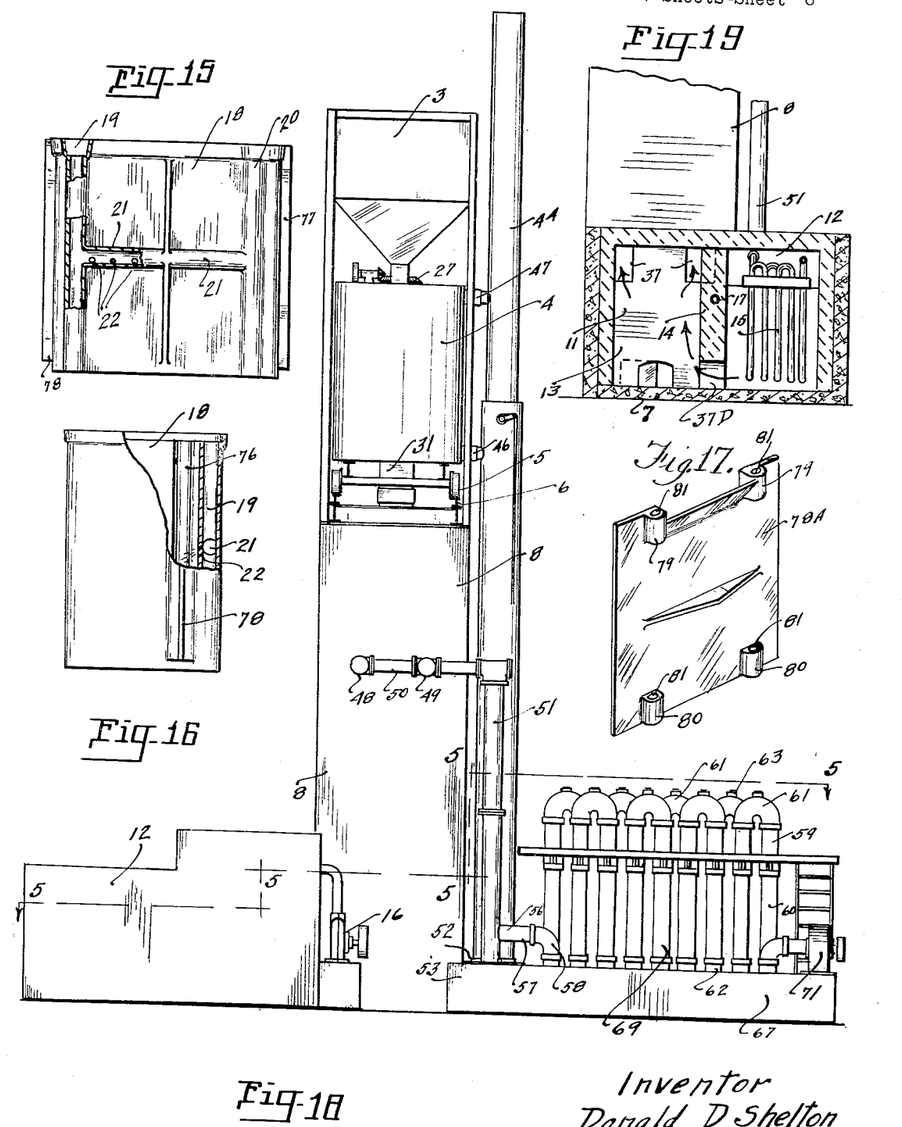
Fig. 15 is a side view, partially in section of the outside wall of the metal structure.
Fig. 16 is a side view, partially in section of the mechanism illustrated in Fig. 15.
Fig. 17 is a perspective, outside, view of one of the closure plates forming the structure.
Fig. 18 is a sectional, side view of the assembled furnace.
Fig. 19 is a fragmentary, sectional, side view through the fire boxes. The same is taken on line 19—19 of Fig. 5, looking in the direction indicated.

The retort is primarily comprised of sections of metal castings 18, as illustrated in Figs. 15 and 16. Each of these metal castings, comprising the retort, has channelways 19 and 20 disposed at either side and within the side wall of the retort against which the mass being treated is made to pass. A channelway 21 is disposed transversely of the wall and intercommunicates between the passageway 19 and 20. The transverse channelway 21 has a plurality of spaced holes 22 disposed therein that permit the heated air to pass directly into the stream flow of the mass of material being treated. These transverse channelways are substantially spaced apart to permit a free intermingling of the heated air with the mass of material. The discharge openings of the spaced holes 22 are so arranged that the blast of heated air emanating therefrom will flow normally downward to better impregnate the mass with the heated air.

A further object in providing the openings 22 with downwardly sloping bottom walls is to prevent the mass of material clogging within the holes and from backing up and filling the channelway with dust and with the comminuted particles of the material being treated.

It is highly important in the treating of cinnabar ores that the temperature of the air being discharged from the holes 22 be above the condensation point of the mercury vapor being liberated, so that the liberated mercury vapor will remain in a vapor condition until the same passes out through the louvers 23.

The heated air carrying the liberated volatiles then flows into a passageway 24.

The dehydrator is comprised of a plurality of shelves 25 that are fixedly positioned and spaced apart within the dehydrator and a power driven shaft 26 vertically disposed within the dehydrator. The shaft is adapted for being driven by any suitable power means as through the use of coacting gears 27 and 28. The power for rotation is applied thereto as by a belt, or chain to the pulley 29. The source of power is not here shown.

A plurality of sweeps 30 are positioned upon the shaft 26 and the material to be dehydrated gravitates through the dehydrator, from shelf to shelf, through the action of the sweeps 30.

A delivery pipe 31 extends through the base of the dehydrator and delivers the material to be treated central of, and upon the spreader head 32 that is disposed within the retort. The material to be treated then gravitates into the treating passageways 33 and 34 that are disposed at either side of the retort. The passageways through which the material passes preferably increase in cross sectional area from their tops to their bottoms to compensate for any swelling of the mass and to facilitate its passage and prevent the arching of the materials.

The temperature to be maintained within the dehydrator should not exceed 550 degrees Fahrenheit where cinnabar ores are being treated and the same should remain within the dehydrator for a sufficient length of time to permit a complete removal of moisture therefrom.

Where a complete recovery of the mercury vapor is to be made, the temperature within the dehydrator should remain substantially below the vaporization point of mercury. The louvered walls 35 and 36 form one side of the retort and the products of combustion developed within the fire box 13 flow from the fire box through the tunnel 37 and upward through the heat transfer channel 39 and out through the windows 40 and 41 that are disposed substantially at the top of the retort. This maintains the cast metal members 18 and the surface thereof at a high temperature and also superheats the air that is to be admitted into the ore stream that passes through the passageway 19, 20 and 21. The products from the fire box then pass downward through the heat transfer chambers 42 and 43 through the base of the furnace and into the stack 44. A hand manipulative damper 45 is disposed within the stack, so that all, or a part of the heat passing through, may be transferred through the passageway 46 that conducts the heat through the dehydrator and back into the stack through the passageway 47. The hand manipulation of the damper 45 controls the draft and at the same time predetermines the maximum heat that may be developed within the dehydrator.

The vapors liberated from the mass of material being treated pass from the passageway 24 through the discharge outlets 48 and 49 and through the pipe 50 into the stand pipe 51.

The stand pipe 51 rests directly upon a suitable base 52. The base 52 is supported upon a masonry foundation 53 having a liquid holding well 54 disposed therein, and the pipe 51 is sealed relative to the liquid holding well by a pipe 55 that is at all times immersed within the liquid disposed within the well. This permits a gravitation of dust and a deposit of the mercury condensed within the pipe 51 directly within the well and into the liquid disposed therein. A flanged outlet 56 is disposed through the side wall of the pipe 51, and a suitable piping connection, as a nipple 57 and an elbow 58 connects the stand pipe 51 with the condensing coils, as illustrated in Fig. 5.

I preferably comprise my condensing system of a plurality of glazed pipe joints 59 and 60. The pipe joints are formed into a coil by the return, or U-shaped fittings 61 and 62. The return bend 62 has an outlet 63 disposed upon its upper surface that communicates with the outside. This opening should be sufficiently large to permit a swabbing, or other cleaning of the pipe system without undue interference with the entire coilage layout. The outlet may be sealed by any suitable means as through the use of a cork 64.

The lower one of the U-shaped fittings 62 has a discharge outlet 65 disposed within its base, and a nipple 66 is secured thereto. Each of the coils rests upon a suitable masonry foundation 67 formed with a liquid holding well 68 immediately below the U-shaped bend 62. The nipple 66 projects into the liquid and maintains a suitable seal therearound. The precipitation of the metallic mercury and dust gravitates from the glazed pipes directly into the liquid holding well 68.

I preferably form my condenser into two batteries 69 and 70 as illustrated in Fig. 5, and I interpose a suitable circulating fan 71 between the two. The fan is driven by any suitable power means applied to the pulley 72. The volatile elements developed within the ore are sucked through the battery of coils 69 and forced through the battery of coils 70. The condenser should be made sufficiently large to slow down the velocity of the fluids being passed therethrough, and the same should be sufficiently long to reduce the temperature of the gases well below the condensation point of the vapors carrying the values to be recovered. The vapors are finally delivered from a U-shaped bend 73 terminating the condensing coils in a water sealed jacket 74, that forms the end of the condensing system.

Figure 13:
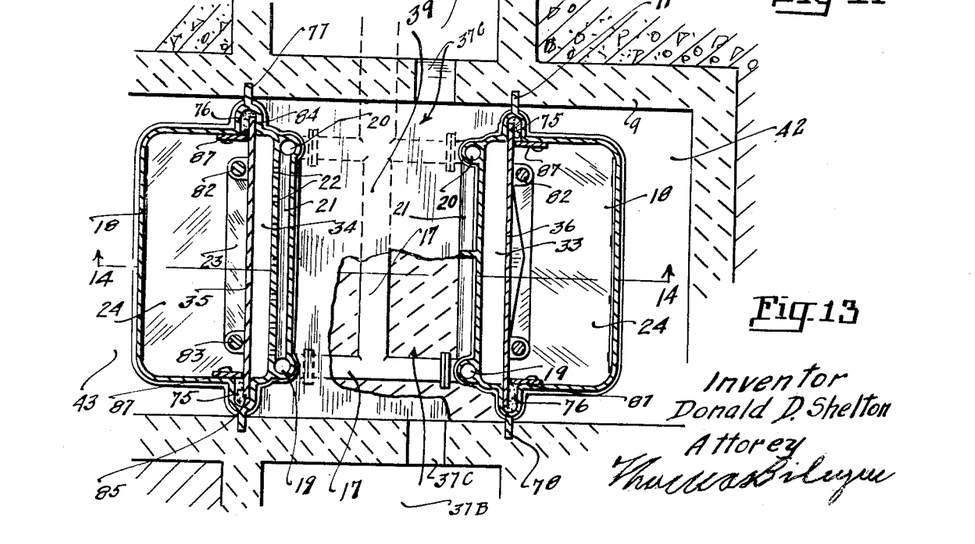
Fig. 13 is a sectional, end view of the lower end of the furnace. The same is taken one line 13—13 of Fig. 8, looking in the direction indicated.

Referring to Fig. 13, guideway pockets 75 and 76 are disposed in opposite sides of the castings 18. Flanges 77 and 78 outwardly extend from the side walls of the castings to form a guide and support for the castings relative to the masonry side walls of the furnace. The movable louvered wall also comprises a plurality of metal castings 78A. The sections comprising the movable louvered wall are placed one above the other in building the movable wall to the required length. Pairs of aligning and supporting bosses 79 and 80 are disposed upon the outside of the metal castings 78A. A hole 81 is disposed longitudinally of each of the bosses and suspending rods 82 and 83 extend through the bosses and the same are threaded on their lower ends to provide a suitable adjustment of the movable louvered walls. The outer ends 84 and 85 of the movable louvered walls are adapted to engage within the guideway pockets 75 and 76. In order to eliminate friction between the movable louvered walls and the metal members, forming the side walls of the respective pockets, and to prevent an abnormal leak of air, or volatile gases therearound, I pack or fill the pockets with a heat resistant mineral compound as asbestos.

In order to provide an adjustment, for the width of the space through which the material being treated is required to pass in the treating operation, I use adjustable plates 86 and 87 and secure the same to the inner wall of the respective castings 18.

A plurality of slots 88 are provided within the plates 86 and 87 through which locking bolts, or screws 89, may be made to pass to lock the plates relative to the castings 18. Links 90 and 91 are disposed between the upper ends of the suspending rods 82 and 83 and the walking beam 92 (see Fig. 8). This provides a balanced working relationship between the pairs of movable louvered walls and lessens the amount of power required to oscillate the louvered walls. The walking beam is supported upon a shaft 93.

Figure 8:
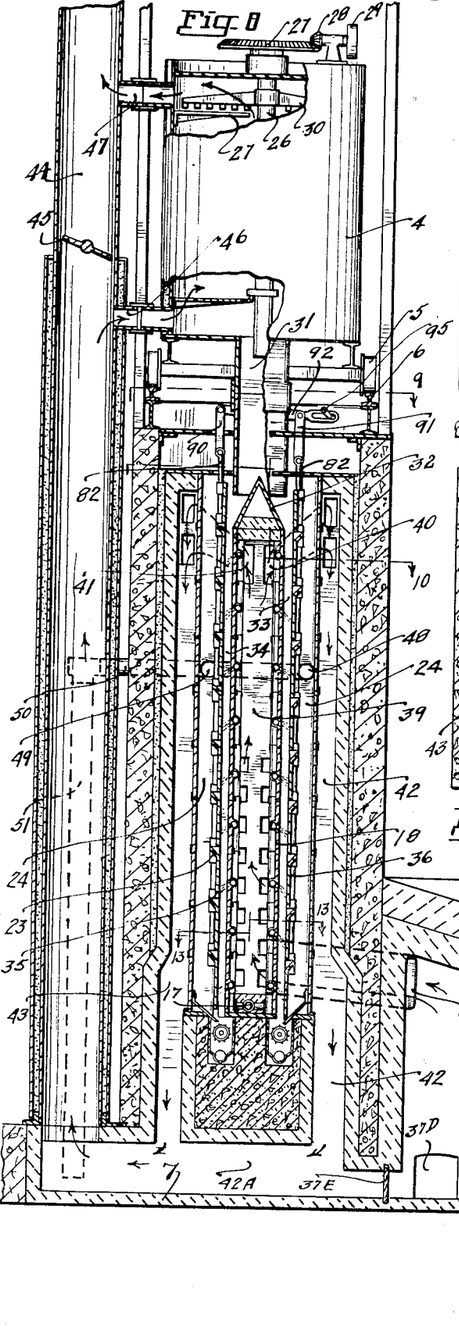
Fig. 8 is a sectional, side view of the primary roasting part of the furnace. The same is taken on line 8—8, of Fig. 1, looking in the direction indicated.
Figure 9:
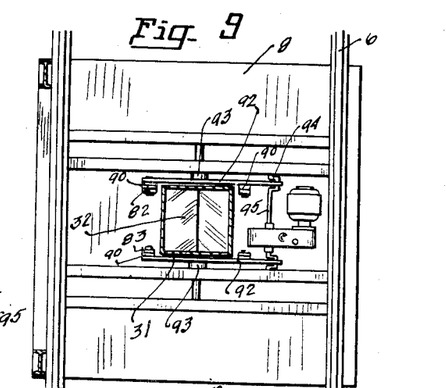
Fig. 9 is a sectional, plan veiw of the mechanism illustrated in Fig. 8. The same is taken on line 9—9 of Fig. 8, looking in the direction indicated. This view illustrates the support and operating mechanism for raising and lowering the louvered walls of the furnace.
Figures 10, 11:
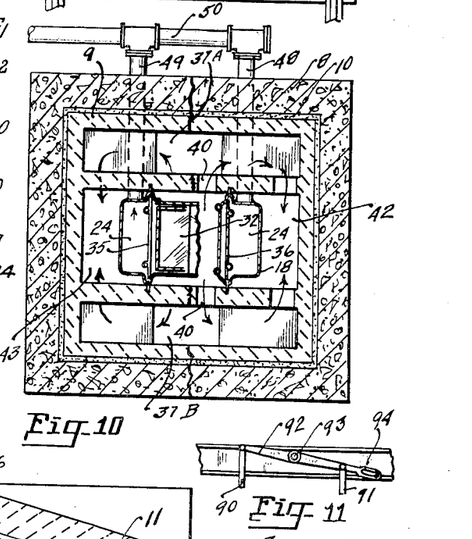
Fig. 10 is a sectional, end view of the mechanism illustrated in Fig. 8. The same is taken on line 10—10 of Fig. 8, looking in the direction indicated. This view is a diagrammatical, sectional view, illustrating the construction of the heat supplying chamber and of the space through which the mass, being treated, is made to pass.
Fig. 11 is a fragmentary, sectional, side view of walking beams and suspending rods depending therefrom used for attaching the walking beams to the louvered walls of the surface. The assembly is shown removed from the furnace.

A cam slot 94 is disposed within the outer end of the walking beam and a power driven crank 95 is adapted for rotation in the cam slot 94.

Figure 12:
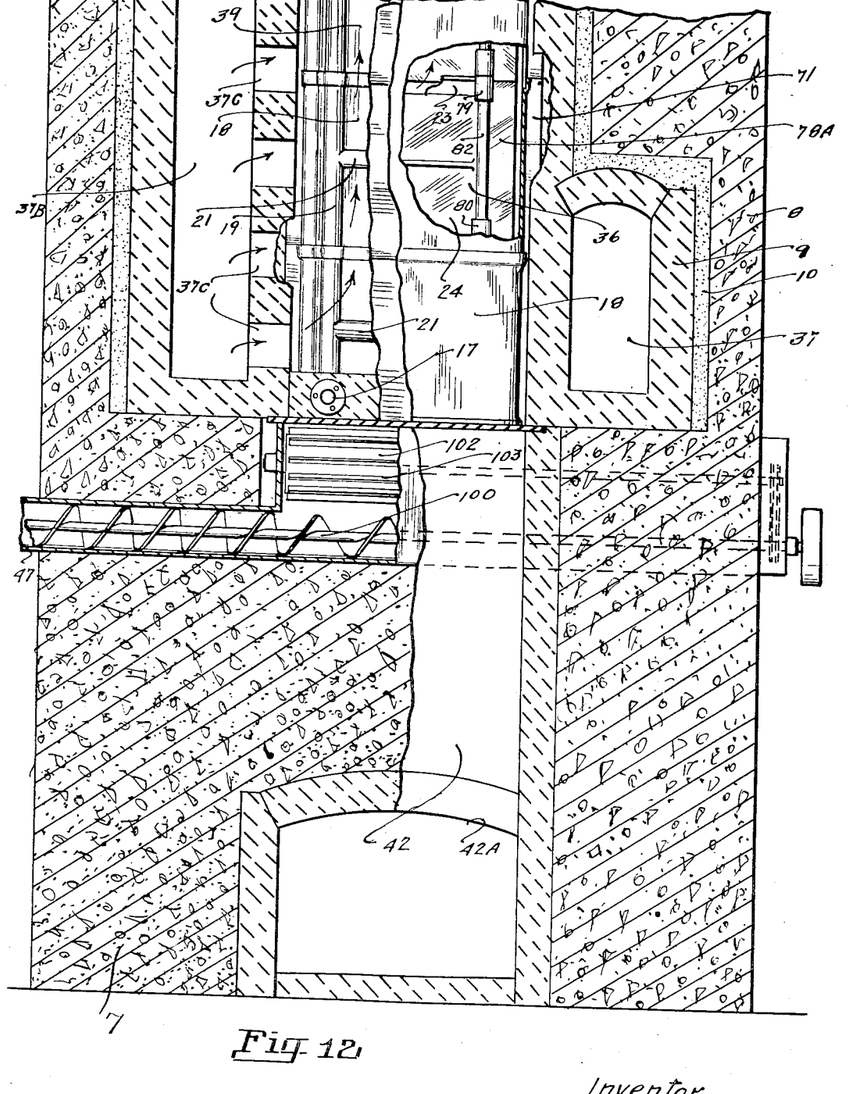
Fig. 12 is a sectional, side view of the furnace and of the ore treating chamber disposed therein. The same is taken on line 12—12 of Fig. 5, looking in the direction indicated.
Figures 20, 21:
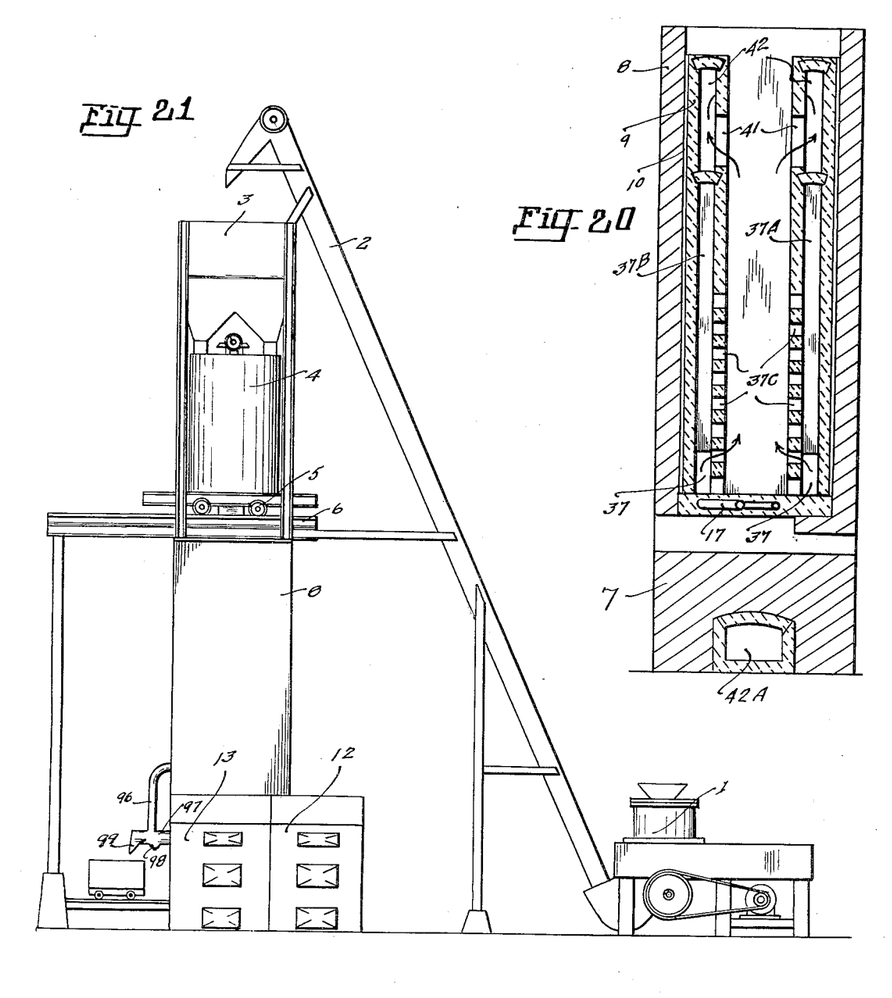
Fig. 20 is a sectional, side view of the masonry and stack structure of the furnace.
Fig. 21 is a side view of the assembled device including a crushing and conveying mechanism.

Mercury vapor being heavier than air will gravitate to the base of the retort and leak out through the screw eliminator 100 that eliminates the treated residues (see Figs. 12 and 21).

Figure 14:
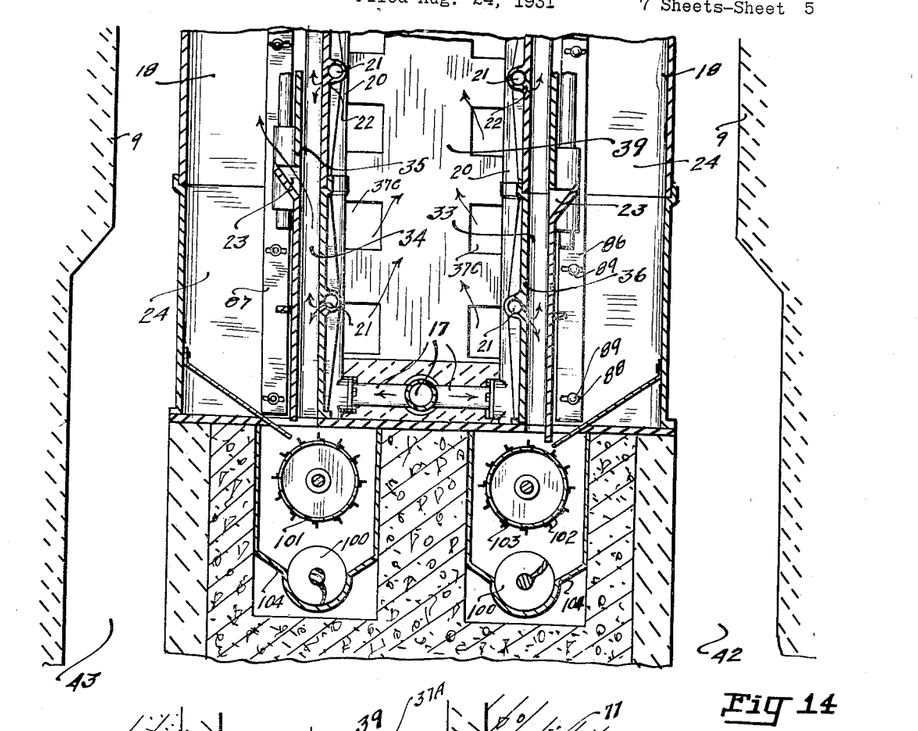
Fig. 14 is a sectional, side view of the lower portion of the furnace. The same is taken on line 14—14 of Fig. 13 looking in the direction indicated.

I provide a pipe 96 connecting the outer end 97 of the screw housing with the condenser system. A pocket 98 is formed in the base of the screw housing into which metallic mercury is permitted to flow. A seal 99 is formed at the outer end of the housing to maintain a relatively tight housing about the screw eliminator 100. A pair of power rotated drums 101 and 102 are disposed below the discharge outlet from the passage through which the material being treated passes and spaced fins 103 outwardly extend from each of the drums. (See Figs. 12 and 14.) The power rotated drums and the power rotated screws are each operated within a metal housing 104 to maintain a tight seal within the base of the retort.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a masonry furnace including a plurality of independent fire boxes spaced apart by partitions, a retort vertically disposed with respect to the furnace and in open communication therewith, a dehydrator superposed the retort, controllable means for heating the dehydrator with hot gases emanating from the furnace, a plurality of shelves disposed within the dehydrator, means for sweeping the materials from shelf to shelf, a communicating passageway disposed between the dehydrator and the retort, means for delivering the dehydrated materials into a plurality of vertically disposed passageways within the retort, means for delivering heated air at a plurality of places within the stream flow of the materials disposed within the passageways, means for delivering materials into the dehydrator by gravity, means for mechanically eliminating the treated residue from the base of the retort, and collectors for the liberated volatiles and means for withdrawing the volatiles and delivering them into a condenser.

2. In a device of the class described, the combination of a furnace having a plurality of spaced independent fire boxes, a plurality of metal pipes disposed within one of the fire boxes, means for circulating air to be heated through the pipes, a retort disposed vertically with respect to the furnace, means for heating one of the primary walls of the retort from within, a movable louvered wall comprising the other primary surface of the retort, said primary walls being spaced apart and uniformly increasing in cross sectional area from the top to the bottom, means for delivering heated air from the pipes through the heated retort wall and delivering the air into a mass of material in its passage therethrough being treated, means for delivering the comminuted dehydrated material into the passageway disposed between the heated retort wall and the movable louvered retort wall, means for eliminating the treated residue from the base of the retort, and means for delivering the liberated volatiles emanating from the mass of material being treated and for passing the same through a condenser.

3. In a device of the class described, the combination of a furnace, a retort disposed vertically with respect to the furnace, fire boxes disposed at the base of the furnace, means for delivering heated air through the retort, a louvered movable wall comprising one of the walls of the retort, said retort walls being spaced apart to form a passageway through which materials to be treated pass, means for delivering dehydrated materials into the passageway after they have been heated to a predetermined maximum temperature in the dehydration, means for eliminating the treated residue from the base of the retort, and means for collecting the liberated volatiles developed in the treatment of the mass being treated and for delivering the volatiles into a condenser and means for condensing the same.

4. In a device of the class described, the combination of a furnace having a plurality of fire boxes associated therewith, means for delivering comminuted materials into a bin disposed above the furnace, means for dehydrating the materials between the bin and the furnace, a retort disposed within the furnace, said retort having two primary surfaces that are spaced apart, means for heating one of the primary surfaces, means for imparting a jigging movement to the other of the primary surfaces of the retort, means for delivering heated air of a predetermined minimum temperature into the space disposed between the primary surfaces comprising the retort, means for liberating the volatiles developed within the space disposed between the retort primary surfaces, louvered means formed in the other of said primary side walls for passing the liberated volatiles therethrough, and means for collecting the volatiles and for condensing the same.

5. In a device of the class described, the combination of a retort comprised of a stationary primary wall and a movable and louvered primary wall, said walls being spaced apart, means for directly heating one of the walls, means for liberating heated air at a plurality of spaces within the space disposed between the spaced walls, means for feeding materials by gravity into the space disposed between the two primary surfaces, means for dehydrating the materials to be passed through the space disposed between the two surfaces, and means for condensing the volatiles liberated through said louvered primary wall.

6. In a device of the class described, the combination of a retort having a fixed heated wall and a louvered movable wall, said walls being spaced apart to form a vertically disposed passageway that uniformly increases in cross sectional area from its top to its bottom, means for delivering dehydrated materials into the passageway at its top, means for delivering heated air into the passageway through which the materials pass that are to be treated and means for delivering the heated air and the developed volatiles from the mass of materials through said louvered wall.

7. In a device of the class described, the combination of a retort comprised of walls spaced apart to form a treating passageway, a dehydrator superposed the passageway, means for heating the dehydrator to a predetermined maximum temperature, means for automatically feeding materials through the dehydrator and into the passageway, means for heating the materials by contacting the same with the heated side wall of the retort, and means for collecting and condensing the volatiles developed within the passageway.

8. In a device of the class described, the combination of a plurality of castings, one arranged above the other to form a retort shell, means for passing a heated fluid through an opening disposed central of the castings forming the shell, guideway pockets disposed in the oppositely disposed sides of the shell members, one or more openings disposed vertically within the shell members, said openings being in registry with each other and adapted for carrying heated air therethrough, a louvered movable plate suspended within the retort, power means for imparting an up and down movement to the louvered movable plate and means for feeding materials through the space disposed between the stationary shell members and the movable plate members.

9. In a device of the class described, the combination of a retort made up of a vertically disposed fixed retort member and a reciprocably disposed and louvered retort member so positioned as to form a passageway between both of said members, means for raising and lowering the movable member, means for delivering heated air into the passageway and means for passing the heated air and liberated volatiles through the said louvered and movable member.

10. In a device of the class described, the combination in a retort of a fixed shell member and a movable plate member disposed within the shell, the plate and shell being so arranged that a material treating passageway is formed therebetween, means for applying heat to the material passing through the passageway, and for supplying heated air into the passageway, means for imparting an up and down movement to the movable plate member, and openings disposed through the side wall of the movable plate member.

11. In a device of the class described, the combination of a retort, said retort being comprised of a stationary shell member and a movable member disposed vertically within guide pockets of the stationary shell, said members being spaced apart to form a material treating passageway, means for admitting air through the shell member into the passageway, louvered openings disposed through the side wall of the movable member, means for heating the shell member and means for imparting an up and down movement to the movable member.

12. In a device of the class described, the combination in a retort of a heated shell comprised of independent castings, a movable louvered plate suspended within the shell, a treating passageway disposed between the broad surfaces of the two members, means for admitting air into the passageway at a predetermined minimum temperature and for withdrawing the vapors from the passageway, means for mechanically feeding materials to be treated into the top of the passageway and for withdrawing the treated residue from the bottom of the passageway and for maintaining a seal at the bottom of the retort during the elimination of the treated residue.

DONALD D. SHELTON.